(12) United States Patent
Takeda et al.

(10) Patent No.: US 10,798,563 B2
(45) Date of Patent: Oct. 6, 2020

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Naoto Ookubo, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/312,482

(22) PCT Filed: Aug. 10, 2017

(86) PCT No.: PCT/JP2017/029217
§ 371 (c)(1),
(2) Date: Dec. 21, 2018

(87) PCT Pub. No.: WO2018/030537
PCT Pub. Date: Feb. 15, 2018

(65) Prior Publication Data
US 2019/0149984 A1    May 16, 2019

(30) Foreign Application Priority Data
Aug. 11, 2016   (CN) .......................... 2016 1 0658885

(51) Int. Cl.
*H04W 8/24*   (2009.01)
*H04W 28/04*  (2009.01)
(Continued)

(52) U.S. Cl.
CPC ............. *H04W 8/24* (2013.01); *H04L 1/1812* (2013.01); *H04L 1/1864* (2013.01);
(Continued)

(58) Field of Classification Search
CPC ....... H04W 8/24; H04W 28/04; H04W 88/02; H04W 84/042; H04L 1/1864; H04L 1/1812
See application file for complete search history.

(56) References Cited

U.S. PATENT DOCUMENTS 8,855,624 B2   10/2014  Gerstenberger et al.
2011/0038352 A1*  2/2011  Bergman .............. H04L 1/1822
                                                          370/331
(Continued)

FOREIGN PATENT DOCUMENTS

JP    2012530475 A    11/2012
JP    2014519214 A    8/2014
WO    2014024304 A1   2/2014

OTHER PUBLICATIONS

Alcatel-Lucent, Alcatel-Lucent Shanghai Bell; "On the TTI bundling enhancement for VoIP"; 3GPP TSG RAN WG1 Meeting #74bis R1-134213; Gangzhou, China, Oct. 7-11, 2013 (4 pages).
(Continued)

*Primary Examiner* — Ajay Cattungal
(74) *Attorney, Agent, or Firm* — Osha Liang LLP

(57) ABSTRACT

The present invention provides a method for configuring a hybrid automatic repeat request (HARQ) mode in a base station, a communication method for use by user terminal supporting communication capabilities of the first type, a base station and user terminal. This user terminal includes a transmission section that transmits information about a capability for supporting HARQ bundling, to a radio base station, and the transmission section transmits bundled HARQ-ACKs to the radio base station based on the capability.

4 Claims, 9 Drawing Sheets

(51) Int. Cl.
*H04L 1/18* (2006.01)
*H04W 88/02* (2009.01)
*H04W 84/04* (2009.01)

(52) U.S. Cl.
CPC .......... *H04W 28/04* (2013.01); *H04W 84/042* (2013.01); *H04W 88/02* (2013.01)

(56) References Cited

U.S. PATENT DOCUMENTS

| | | | | |
|---|---|---|---|---|
| 2011/0075611 | A1* | 3/2011 | Choi | H04L 1/1819 370/329 |
| 2011/0200020 | A1* | 8/2011 | Xu | H04L 1/1887 370/336 |
| 2011/0243075 | A1 | 10/2011 | Luo et al. | |
| 2012/0069815 | A1* | 3/2012 | Aiba | H04W 72/0413 370/329 |
| 2013/0176918 | A1* | 7/2013 | Fu | H04W 72/0413 370/280 |
| 2014/0044206 | A1* | 2/2014 | Nammi | H04L 1/1893 375/267 |
| 2014/0064392 | A1* | 3/2014 | Jonsson | H04L 1/1671 375/267 |
| 2014/0133471 | A1* | 5/2014 | Nammi | H04L 1/06 370/336 |
| 2015/0139164 | A1 | 5/2015 | Yano et al. | |
| 2015/0319753 | A1* | 11/2015 | Chen | H04L 5/0053 370/277 |
| 2016/0204924 | A1* | 7/2016 | Li | H04L 5/0053 370/280 |
| 2017/0163388 | A1* | 6/2017 | Wiemann | H04W 72/0413 |
| 2018/0102915 | A1* | 4/2018 | Rico Alvarino | H04B 7/0656 |
| 2018/0213524 | A1* | 7/2018 | Xiao | H04W 52/34 |

OTHER PUBLICATIONS

Ericsson; "Multi-subframe scheduling design for Enhanced LAA"; 3GPP TSG-RAN WG1#85 R1-165142; Nanjing, China, May 23-27, 2016 (8 pages).
Huawei, HiSilicon; "Views on LTE Rel-14"; 3GPP TSG RAN Meeting #69 RP-151356; Phoenix, USA, Sep. 14-16, 2015 (3 pages).
Intel Corporation; "New WID: High-Performance eMTC (HeMTC)"; 3GPP TSG RAN Meeting #71 RP-160433; Goteborg, Sweden, Mar. 7-10, 2016 (8 pages).
International Search Report issued for PCT/JP2017/029217, dated Oct. 31, 2017 (9 pages).
Written Opinion issued for PCT/JP2017/029217, dated Oct. 31, 2017 (7 pages).
Extended European Search Report issued in the counterpart European Patent Application No. 17839601.6, dated Oct. 25, 2018 (12 pages).
Ericsson; "New WI proposal on Further Enhanced MTC"; 3GPP TSG RAN Meeting #72 RP-161321; Busan, Korea, Jun. 13-16, 2016 (7 pages).
Ericsson; "Higher data rates for MTC"; 3GPP TSG-RAN WG2 #96 Tdoc R2-167617; Reno, Nevada, Nov. 14-18, 2016 (5 pages).

* cited by examiner

USER TERMINAL, RADIO BASE STATION AND RADIO COMMUNICATION METHOD

TECHNICAL FIELD

The present disclosure relates to the field of mobile communication, and, more particularly, relates to a method for configuring a communication scheme for hybrid automatic repeat request (HARQ) in a base station connected with user terminal supporting varying communication capabilities, a communication method for use by user terminal supporting communication capabilities of the first type, a base station and user terminal.

BACKGROUND ART

Long-term evolution (LTE) mobile communication networks are deployed widely throughout the world, and the traffic of wireless data carried on them is rapidly increasing. This increase is due not only to conventional communication between people (that is, the mobile internet) but also due to the internet of things between communication devices, which is growing rapidly. Therefore, future LTE mobile communication networks need to have capabilities to cope with ever-increasing wireless data traffic.

In order to fulfill the requirements for coping with constantly-increasing data traffic, the standardization of LTE mobile communication networks is underway. There are cases where some technical specifications are incompatible between old and new technical standards or between different versions of the same technical standard. Consequently, when user terminal (UE) that supports an old standard and user terminal that supports a new standard are co-present in an LTE mobile communication network, or when pieces of user terminal that support different versions of the same standard are co-present, a base station to connect with these pieces of user terminal cannot identify which standard or version each piece of user terminal supports, and so there is a possibility that accurate and efficient communication cannot be realized between the base station and the user terminal. For example, user terminal that supports LTE release 13 and user terminal that supports LTE release 14 can co-exist in the same mobile communication network, and, when a base station communicates with a certain piece of user terminal, the base station cannot judge whether the user terminal supports LTE release 13 or LTE release 14, and cannot communicate with this user terminal accurately or efficiently. Furthermore, for example, the scheme for communicating using HARQ varies between LTE release 13 and LTE release 14, and a base station, unable to judge whether connecting user terminal supports LTE release 13 or LTE release 14, cannot perform accurate HARQ communication with the user terminal.

SUMMARY OF INVENTION

Solution to Problem

One aspect of the present disclosure provides a user terminal having a transmission section that transmits information about a capability for supporting HARQ bundling, to a radio base station, and, in this user terminal, the transmission section transmits bundled HARQ-ACKs to the radio base station based on the capability.

One aspect of the present disclosure provides a user terminal having a transmission section that transmits information about a capability for configuring more than eight HARQ processes, to a radio base station, and a receiving section that receives HARQ process numbers from four-bit data in downlink control information.

One embodiment of the present disclosure provides a method of configuring a hybrid repeat request (HARQ) communication scheme in a base station connected with user terminal supporting varying communication capabilities, and this method includes the steps of acquiring communication capability information for user terminal, determining whether the user terminal supports communication capabilities of the first type based on the user terminal's communication capability information, and, when the user terminal supports communication capabilities of the first type, configuring the HARQ mode between the user terminal and the base station based on communication capabilities of the first type.

The method according to the above embodiment further includes the step of configuring the HARQ mode between the user terminal and the base station based on communication capabilities of a second type when the user terminal does not support communication capabilities of the first type.

In the method of the above embodiment, the HARQ mode includes the configuration of HARQ process numbers in downlink data and the feedback scheme for delivering HARQ acknowledgments in response to downlink data.

The method according to the above embodiment further includes the step of broadcasting system information before the step of acquiring the communication capability information for the user terminal, and the system information includes random access channel (RACH) resource grouping information, which commands division of RACH resources into a first resource group, which corresponds to communication capabilities of the first type, and a second resource group, which corresponds to communication capabilities of a second type.

In the method of the above embodiment, the communication capability information for the user terminal is acquired by identifying the resource used for the RACH preamble that is received from the user terminal.

In the method of the above embodiment, the step of determining whether the user terminal supports communication capabilities of the first type based on the user terminal's communication capability information includes the steps of determining whether the resource used for the RACH preamble that is received from the user terminal belongs to the first resource group, and determining that the user terminal supports communication capabilities of the first type when the resource used for the RACH preamble received from the user terminal belongs to the first resource group.

In the method of the above embodiment, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

In the method of the above embodiment, the communication capability information for the user terminal is acquired by receiving a message including the communication capability information from the user terminal.

In the method of the above embodiment, the communication capability information for the user terminal is acquired by receiving a message including the communication capability information, from a mobility management entity (MME).

The method according to the above embodiment may further include the step of configuring the HARQ mode between the user terminal and the base station based on communication capabilities of the second type, before it is determined that the user terminal supports communication capabilities of the first type, or before the HARQ mode between the user terminal and the base station is configured based on first-type communication capabilities.

Another embodiment of the present disclosure provides a base station to be connected with user terminal supporting varying communication capabilities, and this base station includes an acquiring section configured to acquire communication capability information for user terminal, a determining section configured to determine whether the user terminal supports communication capabilities of the first type based on the user terminal's communication capability information, and a configuration section configured to configure the HARQ mode between the user terminal and the base station based on communication capabilities of the first type when the user terminal supports first-type communication capabilities.

In the base station of this embodiment, the configuration section is configured so that, when the user terminal does not support communication capabilities of the first type, the HARQ mode between the user terminal and the base station is configured based on communication capabilities of a second type.

In the base station of this embodiment, the HARQ mode includes the configuration of HARQ process numbers in downlink data and the feedback scheme for delivering HARQ acknowledgments in response to downlink data.

The base station according to this embodiment further includes a broadcasting section that broadcasts system information before the acquiring section acquires the communication capability information for the user terminal, and the system information includes random access channel (RACH) resource grouping information, which commands division of RACH resources into a first resource group, which corresponds to communication capabilities of the first type, and a second resource group, which corresponds to communication capabilities of the second type.

In the base station of this embodiment, the acquiring section acquires the communication capability information for the user terminal by identifying the resource used for the RACH preamble that is received from the user terminal.

In the base station of this embodiment, the determining section further determines whether the resource used for the RACH preamble that is received from the user terminal belongs to the first resource group, and determines that the user terminal supports communication capabilities of the first type when the resource used for the RACH preamble received from the user terminal belongs to the first resource group.

In the base station of this embodiment, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

In the base station of this embodiment, the acquiring section is configured to acquire the communication capability information for the user terminal by receiving a message, including the communication capability information, from the user terminal.

In the base station of this embodiment, the acquiring section is configured to acquire the communication capability information for the user terminal by receiving a message, including the communication capability information, from a mobility management entity (MME).

In the base station of this embodiment, the configuration section is further configured so that, before it is determined that the user terminal supports communication capabilities of the first type, or before the HARQ mode between the user terminal and the base station is configured based on communication capabilities of the first type, the HARQ mode between the user terminal and the base station is configured based on communication capabilities of the second type.

Another embodiment of the present disclosure provides a communication method for use by user terminal supporting communication capabilities of the first type, and this method includes the steps of receiving system information, which includes random access channel (RACH) resource grouping information, which commands division of RACH resources into a first resource group, which corresponds to communication capabilities of the first type, and a second resource group, which corresponds to communication capabilities of a second type, transmitting the RACH preamble to the base station using the first resource group corresponding to first-type communication capabilities, and configuring a hybrid automatic repeat request (HARQ) mode between the user terminal and the base station based on communication capabilities of the first type.

In the method of the above embodiment, the HARQ mode includes the configuration of HARQ process numbers in downlink data and the feedback scheme for delivering HARQ acknowledgments in response to downlink data, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

Another embodiment of the present disclosure provides user terminal that supports communication capabilities of a first type, and this user terminal includes a receiving section configured to receive, from a base station, system information that includes random access channel (RACH) resource grouping information, which commands division of RACH resources into a first resource group, which corresponds to communication capabilities of the first type, and a second resource group, which corresponds to communication capabilities of a second type, a transmission section configured to transmit the RACH preamble to the base station using the first resource group, corresponding to communication capabilities of the first type, and a processing section configured to configure a hybrid automatic repeat request (HARQ) mode between the user terminal and the base station based on communication capabilities of the first type.

In the user terminal of this embodiment, the HARQ mode includes the HARQ bundling scheme, the configuration of HARQ process numbers in downlink data, and the feedback scheme for delivering HARQ acknowledgments in response to downlink data, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

Another embodiment of the present disclosure provides a communication method for use by user terminal supporting communication capabilities of the first type, and this method includes the steps of transmitting a message, which includes communication capability information for the user terminal, to a base station, and configuring a hybrid automatic repeat request (HARQ) mode between the user terminal and the base station based on communication capabilities of the first type.

The method according to this embodiment further includes the steps of receiving an acknowledgment in response to the message from the base station, and configuring the HARQ mode between the user terminal and the base station based on communication capabilities of a second type, before an acknowledgment is received in response to the message.

Another embodiment of the present disclosure provides user terminal supporting communication capabilities of the first type, and this user terminal includes a transmission section configured to transmit a message, which includes communication capability information for the user terminal, to a base station, and a processing section that is configured to configure a hybrid automatic repeat request (HARQ) mode between the user terminal and the base station based on communication capabilities of the first type.

The user terminal according to this embodiment further includes a receiving section configured to receive an acknowledgment in response to the message from the base station, and the processing section is configured to configure the HARQ mode between the user terminal and the base station based on communication capabilities of the second type before the acknowledgment in response to the message is received in the receiving section.

BRIEF DESCRIPTION OF DRAWINGS

Now, with reference to the accompanying drawings, embodiments of the present disclosure will be described in further detail to clarify the above-described contents of the present disclosure, as well as other objects, features and advantages. The drawings are provided to further understand the embodiments of the present disclosure, considered part of the specification, and used to interpret the present disclosure along with the embodiments of the present disclosure, without limiting the present disclosure. In the drawings, the same reference numerals generally indicate the same elements or steps.

DESCRIPTION OF EMBODIMENTS

Now, exemplary embodiments of the present disclosure will be described below in detail, with reference to the accompanying drawings, to further clarify the objects, technical solutions, and advantages of the present disclosure. Obviously, it should be understood that the embodiments described below are only part of the embodiments of the present disclosure, and do not represent all of the embodiments of the present disclosure, and the present disclosure is by no means limited to the exemplary embodiments described herein. Any other embodiments which a person skilled in the art can derive from the embodiments of the present disclosure described herein without requiring creative effort are all within the scope of protection of the present disclosure.

Figure 1:
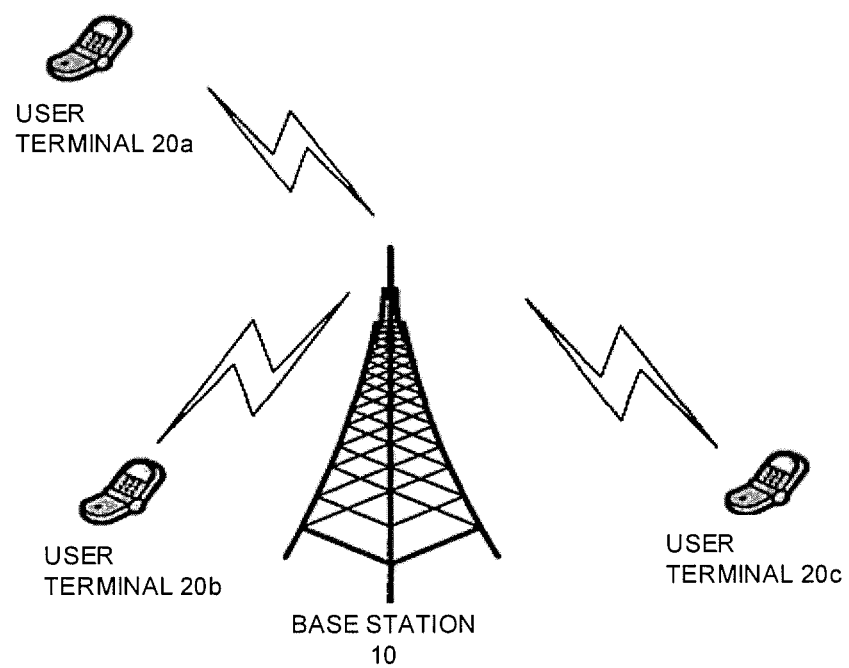
FIG. 1 is a schematic diagram to show an internet-of-things communication system, to which an embodiment of the present disclosure can be applied.

FIG. 1 is a schematic diagram to show an internet-of-things system, to which the embodiments of the present disclosure can be applied. As shown in FIG. 1, this internet-of-thing system includes a base station 10 and user terminal 20a to 20c, which communicate by exchanging control messages and data. As an illustrative explanation of an example, the user terminal 20a in FIG. 1 supports communication capabilities of the first type, the user terminal 20b supports communication capabilities of the second type, and the user terminal 20c supports first-type communication capabilities and second-type communication capabilities at the same time. Obviously, the internet-of-things system may further include other pieces of user terminal that support other types of communication capabilities, and the present disclosure does not limit this. It should be noted that terms such as "first," "second," and "third" used herein and in the following text are used only for the purpose of identifying each referenced object, and are not intended to define the order of objects or the ranking of their priority.

In the following embodiments of the present disclosure, presuming a number of different technical standards, communication capabilities of the first type will refer to capabilities to communicate according to the first technical standard, and communication capabilities of a second type will refer to capabilities to communicate according to a second technical standard. When different versions of the same technical standard are provided, communication capabilities of the first type will refer to capabilities to communicate according to the first version (for example, a new version) of the technical standard, and communication capabilities of the second type will refer to capabilities to communicate according to a second version (for example, an old version) of the technical standard.

For example, in the following embodiments of the present disclosure, communication capabilities of the first type will refer to capabilities to communicate according to the LTE release 14 standard, and communication capabilities of the second type will refer to capabilities to communicate according to the LTE release 13 standard. These two versions of the LTE standard support different HARQ modes (including, for example, the configuration of HARQ process numbers in downlink data, and the feedback scheme for delivering HARQ acknowledgments in response to downlink data). For example, in the LTE release 13 standard, at most eight HARQ processes are configured, and user terminal sends feedback in response to downlink data from a base station on a one-to-one basis. That is, user terminal transmits HARQ feedback information in response to every downlink data from a base station, where the feedback information is, for example, a positive acknowledgment (ACK), which indicates that data has been received successfully, or a negative acknowledgment (NACK), which indicates that data has not been received. The LTE release 14 standard allows more than eight HARQ processes to be configured, and the user terminal can send feedback in response to downlink data from the base station based on a one-to-many scheme—that is, the user terminal can use HARQ bundling. To be more specific, the user terminal can bundle feedback information in response to a plurality of pieces of downlink data together, and transmit the bundled feedback information to the base station. For example, feedback information in response to a plurality of downlink data is logically added, and the result of the addition is transmitted to the base station as feedback information. In this case, an HARQ bundling window is set up, and feedback information in response to data received in the HARQ bundling window is bundled and transmitted.

When user terminal and a base station communicate with each other, the base station needs to determine the communication capabilities of the user terminal in order to configure the HARQ mode appropriately, and, to be more specific, the base station needs to determine whether the user terminal supports communication capabilities of the first type. When the user terminal supports communication capabilities of the first type, the base station configures the HARQ mode between the user terminal and the base station based on communication capabilities of the first type. If the user terminal supports only communication capabilities of the second type, the base station configures the HARQ mode between the user terminal and the base station based on communication capabilities of the second type.

Now, with reference to the accompanying drawings, a method of configuring HARQ mode in the base station, a communication method for use by user terminal supporting communication capabilities of the first type, and a corresponding base station and user terminal according to embodiments of the present disclosure will be described below.

Figure 2:
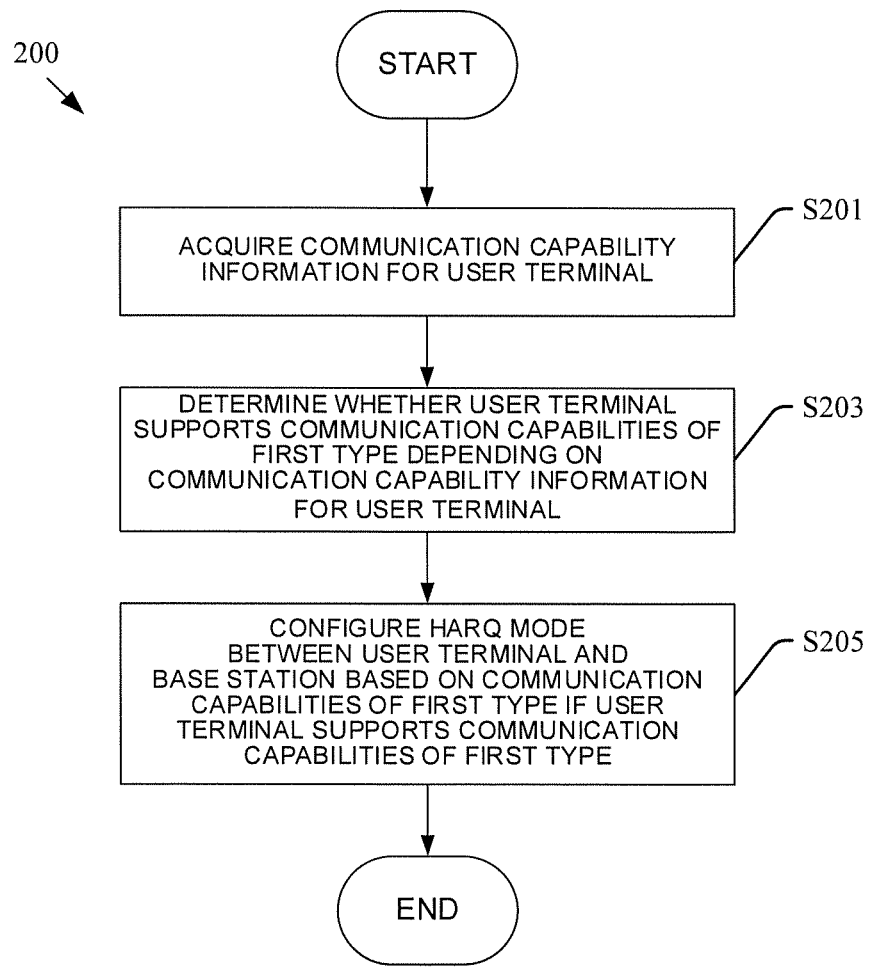
FIG. 2 is a flowchart to show a method of configuring HARQ mode in a base station connected with user terminal supporting varying communication capabilities, according to an embodiment of the present disclosure.

First, a method 200 for configuring HARQ mode in a base station according to an embodiment of the present disclosure will be described with reference to FIG. 2. In step S201, communication capability information for user terminal is acquired. In step S203, depending on the communication capability information for the user terminal, whether or not the user terminal supports communication capabilities of the first type is determined. In step S205, if the user terminal supports communication capabilities of the first type, the HARQ mode between the user terminal and the base station is configured based on the communication capabilities of the first type.

Now, the method 200 will be described below in detail in combination with various embodiments.

In the first embodiment, the method 200 further includes the step of broadcasting system information before step S201 for acquiring communication capability information for the user terminal is executed, where the system information includes grouping information of random access channel (RACH) resources. The RACH resource grouping information commands division of random access channel (RACH) resources into a first resource group, which corresponds to communication capabilities of the first type, and a second resource group, which corresponds to communication capabilities of the second type. For example, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

On the user terminal side, upon receiving system information, the user terminal transmits a RACH preamble to the base station in accordance with the RACH resource grouping information. For example, if the user terminal supports communication capabilities of the first type, the user terminal may transmit a RACH preamble to the base station using a first frequency resource or a first time resource, or the user terminal may transmit one RACH preamble that is selected from the first preamble group, to the base station. When the user terminal supports communication capabilities of the second type, the user terminal may transmit a RACH preamble to the base station using a second frequency resource or a second time resource, or the user terminal may transmit one RACH preamble that is selected from the second preamble group, to the base station.

Next, when the base station receives a RACH preamble from the user terminal, in step S201, the base station acquires information about the resource used for the RACH preamble as communication capability information for the user terminal. For example, the base station acquires the communication capability information for the user terminal by identifying the frequency resource or the time resource used for the RACH preamble. Also, for example, the base station acquires the communication capability information for the user terminal by finding out whether the RACH preamble belongs to the first preamble group or the second preamble group. The communication capability information for the user terminal in this case is information to indicate that the RACH preamble that is determined belongs to the first preamble group or the second preamble group.

Next, in step S203, the base station determines that the resource that is used for the RACH preamble received from the user terminal belongs to the first resource group. If the resource used for the RACH preamble received from the user terminal belongs to the first resource group, the base station determines that the user terminal supports communication capabilities of the first type. If the resource used for the RACH preamble received from the user terminal belongs to the second resource group, the base station determines that the user terminal supports communication capabilities of the second type. For example, if the frequency resource used for the received RACH preamble is the first frequency resource, if the time resource used for the received RACH preamble is the first time resource, or if the received RACH preamble belongs to the first preamble group, the base station determines that the user terminal supports communication capabilities of the first type. If the frequency resource used for the received RACH preamble is the second frequency resource, if the time resource used for the received RACH preamble is the second time resource, or if the received RACH preamble belongs to the second preamble group, the base station determines that the user terminal supports communication capabilities of the second type.

In step S205, if the user terminal supports communication capabilities of the first type, the base station configures the HARQ mode between the user terminal and the base station based on communication capabilities of the first type. On the other hand, if the user terminal does not support communication capabilities of the first type, the base station configures the HARQ mode between the user terminal and the base station based on communication capabilities of the second type. As mentioned above, the HARQ mode may include the scheme for configuring HARQ process numbers in downlink data, and the feedback scheme for delivering HARQ acknowledgments in response to downlink data.

In an example of configuring the feedback scheme for delivering HARQ acknowledgments in response to downlink data, when the user terminal supports communication capabilities of the second type, the feedback scheme then is configured so that HARQ feedback information is transmitted to the base station in response to every downlink data. When the user terminal supports communication capabilities of the first type, the user terminal may bundle feedback information in response to a plurality of pieces of downlink data together and transmit the bundled feedback information to the base station.

Note that, in an example of the scheme for configuring HARQ process numbers, when the user terminal supports communication capabilities of the second type, the number of HARQ processes (the number of processes is $2^3=8$) between the user terminal and the base station is represented with three bits of data in downlink control information (DCI), so that the HARQ process numbers are set between 0 and 7. If the user terminal supports communication capabilities of the first type, the number of HARQ processes (the number of processes is $2^4=16$) between the user terminal and the base station is represented with four bits in downlink control information, so that the HARQ process numbers are set between 0 and 15.

Obviously, the HARQ mode between the user terminal and the base station may be further based on other HARQ-related properties or modes.

One specific example according to the above first embodiment will be described below in detail with reference to FIG. 6.

In a second embodiment, step S201 includes the step of acquiring communication capability information for user terminal by receiving a message including the communication capability information, from the user terminal. For example, the user terminal may place information to indicate that the user terminal supports communication capabilities of the first type or communication capabilities of the second type, in a message to transmit to the base station, so that, upon receiving the message, the base station can acquire the communication capability information. The message is selected flexibly, on an as-needed basis, and may be, for example, a radio resource control (RRC) connection complete message.

In step S203, based on the communication capability information for the user terminal, the base station determines whether the user terminal supports communication capabilities of the first type. To be more specific, if the communication capability information acquired in step S201 is information to indicate that the user terminal supports communication capabilities of the first type, the base station determines that the user terminal supports communication capabilities of the first type. If the communication capability information acquired in step S201 is information to indicate that the user terminal supports communication capabilities of the second type, the base station determines that the user terminal supports communication capabilities of the second type.

In step S205, the HARQ mode between the user terminal and the base station is configured. Here, the HARQ mode between the user terminal and the base station may be configured in a similar manner to the above-described first embodiment, and therefore explanation will be omitted here.

Also, in the second embodiment, even before it is determined that the user terminal supports communication capabilities of the first type, the HARQ mode between the user terminal and the base station may be configured based on communication capabilities of the second type. Alternatively, before the HARQ mode between the user terminal and the base station is configured based on first-type communication capabilities, the HARQ mode between the user terminal and the base station may be configured the second type. For example, after the base station determines in step S203 that the user terminal supports communication capabilities of the first type, the base station transmits an acknowledgement message to the user terminal. Before the acknowledgement message is sent out, the HARQ mode between the user terminal and the base station is configured based on communication capabilities of the second type, and, after the acknowledgement information is sent, the HARQ mode between the user terminal and the base station is configured based on communication capabilities of the first type.

One specific example according to the above second embodiment will be described below in detail with reference to FIG. 7.

In a third embodiment, step S201 includes the step of acquiring communication capability information for user terminal by receiving a message, which includes the communication capability information, from a mobility management entity (MME). For example, the mobility management entity may place information to indicate that the user terminal supports communication capabilities of the first type or communication capabilities of the second type, in a message to transmit to the base station, so that, upon receiving the message, the base station can acquire the communication capability information. The above message is selected flexibly, on an as-needed basis, and may be, for example, an initial context setup request.

In step S203, based on the communication capability information for the user terminal, the base station determines whether the user terminal supports communication capabilities of the first type. Here, the base station may determine whether the user terminal supports communication capabilities of the first type in a similar manner to the above-described second embodiment, and therefore explanation will be omitted here.

In step S205, the HARQ mode between the user terminal and the base station is configured. Here, the HARQ mode between the user terminal and the base station may be configured in a similar manner to the first embodiment or the second embodiment, and therefore explanation will be omitted here.

Also, in the third embodiment, before it is determined that the user terminal supports communication capabilities of the first type, or before the HARQ mode between the user terminal and the base station is configured based on first-type communication capabilities, the HARQ mode between the user terminal and the base station may be configured based on communication capabilities of the second type. For example, after the base station executes step S205 to configure the HARQ mode between the user terminal and the base station, the base station transmits an RRC connection reset message to the user terminal, and before the base station receives an acknowledgement in response to the RRC connection reset message from the user terminal, the HARQ mode between the user terminal and the base station is configured based on communication capabilities of the second type.

One specific example according to the above third embodiment will be described below in detail with reference to FIG. 8.

Now, a base station according to an embodiment of the present disclosure will be described below with reference to FIG. 3, and this base station performs the method 200 for configuring the HARQ mode, which has been described above with reference to FIG. 2.

Figure 3:
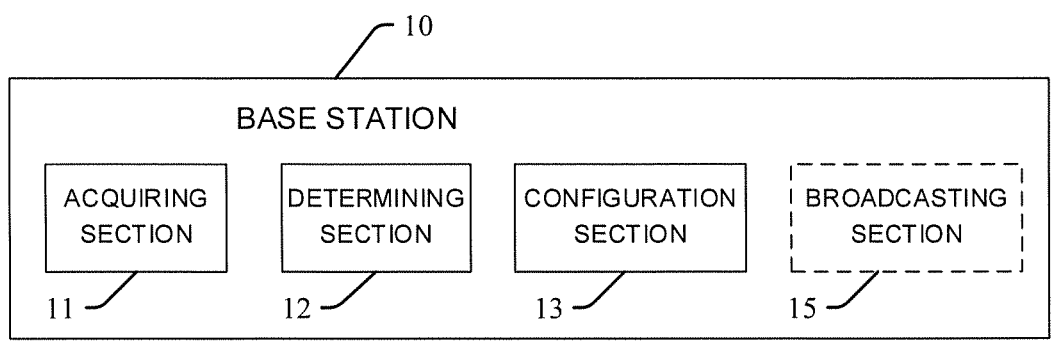
FIG. 3 is a block diagram to show a base station connected with user terminal supporting varying communication capabilities, according to an embodiment of the present disclosure.

As shown in FIG. 3, the base station 10 includes an acquiring section 11, a determining section 12 and a configuration section 13. In one example, the base station 10 may further include a broadcasting section 15 shown in dashed lines in FIG. 3. Note that, although FIG. 3 only shows elements that are closely related to the embodiment of the present disclosure in the base station 10, these are only illustrative, and the base station 10 may include other elements as well, on an as-needed basis.

For example, the acquiring section 11 is configured to acquire communication capability information for user terminal. The determining section 12 is configured to determine whether the user terminal supports communication capabilities of the first type based on the user terminal's communication capability information. When the user terminal supports communication capabilities of the first type, the configuration section 13 is configured so that the HARQ mode between the user terminal and the base station is configured based on communication capabilities of the first type.

Combined with the first embodiment that has been described above with reference to FIG. 2, the broadcasting section 15 may be configured to broadcast system information before the acquiring section 11 acquires the communication capability information for the user terminal, and this system information includes RACH resource grouping information. The RACH resource grouping information commands division of random access channel (RACH) resources into a first resource group, which corresponds to communication capabilities of the first type, and a second resource group, which corresponds to communication capabilities of the second type. For example, the first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

After receiving the system information, the user terminal transmits a RACH preamble to the base station in accordance with the RACH resource grouping information.

After the acquiring section 11 receives the RACH preamble from the user terminal, the acquiring section 11 acquires the communication capability information for the user terminal by identifying the resource used for the RACH preamble. For example, the acquiring section 11 acquires the communication capability information for the user terminal by identifying the frequency resource or the time resource used for the RACH preamble. Also, for example, the acquiring section 11 acquires the communication capability information for the user terminal by finding out whether the RACH preamble belongs to the first preamble group or the second preamble group.

Next, the determining section 12 is configured to find out whether the resource used for the RACH preamble received from the user terminal belongs to the first resource group. If the resource used for the RACH preamble received from the user terminal belongs to the first resource group, the determining section 12 determines that the user terminal supports communication capabilities of the first type. If the resource used for the RACH preamble received from the user terminal belongs to the second resource group, the determining section 12 determines that the user terminal supports communication capabilities of the second type. For example, if the frequency resource used for the received RACH preamble is a first frequency resource or the time resource used for the received RACH preamble is a first time resource, or if the received RACH preamble belongs to the first preamble group, the determining section 12 determines that the user terminal supports communication capabilities of the first type. If the frequency resource used for the received RACH preamble is a second frequency resource or the time resource used for the received RACH preamble is a second time resource, or if the received RACH preamble belongs to the second preamble group, the determining section 12 determines that the user terminal supports communication capabilities of the second type.

If the determination section 12 determines that the user terminal supports communication capabilities of the first type, the configuration section 13 configures the HARQ mode between the user terminal and the base station based on communication capabilities of the first type. On the other hand, if the user terminal does not support communication capabilities of the first type, the configuration section 13 configures the HARQ mode between the user terminal and the base station based on communication capabilities of the second type.

The HARQ mode may include the scheme for configuring HARQ process numbers in downlink data, and the feedback scheme for delivering HARQ acknowledgments in response to downlink data.

In an example of configuring the feedback scheme for delivering HARQ acknowledgments in response to downlink data, when the user terminal supports communication capabilities of the second type, the configuration section 13 configures the feedback scheme then so that HARQ feedback information is transmitted to the base station in response to every downlink data. When the user terminal supports communication capabilities of the first type, the configuration section 13 may bundle feedback information in response to a plurality of pieces of downlink data and transmit the bundled feedback information to the base station.

Note that, in an example of the scheme for configuring HARQ process numbers, when the user terminal supports communication capabilities of the second type, the configuration section 13 represents the number of HARQ processes (the number of processes is $2^3=8$) between the user terminal and the base station with three bits of data, in downlink control information (DCI), so that the HARQ process numbers are set between 0 and 7. When the user terminal supports communication capabilities of the first type, the configuration section 13 represents the number of HARQ processes (the number of processes is $2^4=16$) between the user terminal and the base station with four bits, in downlink control information, so that the HARQ process numbers are set between 0 and 15.

Combined with the second embodiment, which has been described above with reference to FIG. 2, the acquiring section 11 may be further configured to acquire communication capability information for user terminal by receiving a message, including the communication capability information, from the user terminal. For example, the user terminal may place information to indicate that the user terminal supports communication capabilities of the first type or communication capabilities of the second type, in a message to transmit to the base station, so that, upon receiving the message, the base station can acquire the above-described communication capability information. This message can be selected flexibly, on an as-needed basis, and may be, for example, a radio resource control (RRC) connection complete message.

The determining section 12 may be configured so that, when the communication capability information acquired from the acquiring section 11 indicates that the user terminal supports communication capabilities of the first type, the determining section 12 determines that the user terminal supports communication capabilities of the first type. When the communication capability information acquired from the acquiring section 11 indicates that the user terminal supports communication capabilities of the second type, the determining section 12 determines that the user terminal supports communication capabilities of the second type.

Also, the configuration section 13 may be further configured so that, even before it is determined that the user terminal supports communication capabilities of the first type, or before the HARQ mode between the user terminal and the base station is configured based on first-type communication capabilities, the HARQ mode between the user terminal and the base station is configured based on second-type communication capabilities. For example, after the configuration section 12 determines that the user terminal supports communication capabilities of the first type, the configuration section 12 transmits an acknowledgement message to the user terminal. Before the acknowledgement message is sent out from the configuration section 12 to the user terminal, the configuration section 13 configures the HARQ mode between the user terminal and the base station based on communication capabilities of the second type.

Combined with the third embodiment, which has been described above with reference to FIG. 2, the acquiring section 11 may be further configured to acquire the communication capability information for the user terminal by receiving a message that includes the communication capability information, from a mobility management entity (MME). For example, the mobility management entity may place information to indicate that the user terminal supports communication capabilities of the first type or communication capabilities of the second type, in a message to transmit to the base station, so that, upon receiving the message, the base station can acquire the communication capability information. The message can be selected flexibly, on an as-needed basis, and may be, for example, an initial context setup request.

Also, the configuration section 13 may be configured so that, even before it is determined that the user terminal supports communication capabilities of the first type, or before the HARQ mode between the user terminal and the base station is configured based on first-type communication capabilities, the HARQ mode between the user terminal and the base station is configured based on second-type communication capabilities. For example, the configuration section 13 configures the HARQ mode between the user terminal and the base station, and then, in addition, transmits an RRC connection reset message to the user terminal. The configuration section 13 may configure the HARQ mode between the user terminal and the base station based on communication capabilities of the second type before an acknowledgement in response to the RRC connection reset message is received from the user terminal.

Now, communication methods for user terminal supporting communication capabilities of the first type, according to embodiments of the present disclosure, will be described below with reference to FIGS. 4A and 4B. The method 400 shown in FIG. 4A corresponds to the first embodiment among the methods for configuring the HARQ mode, described with reference to FIG. 2.

Figure 4A:
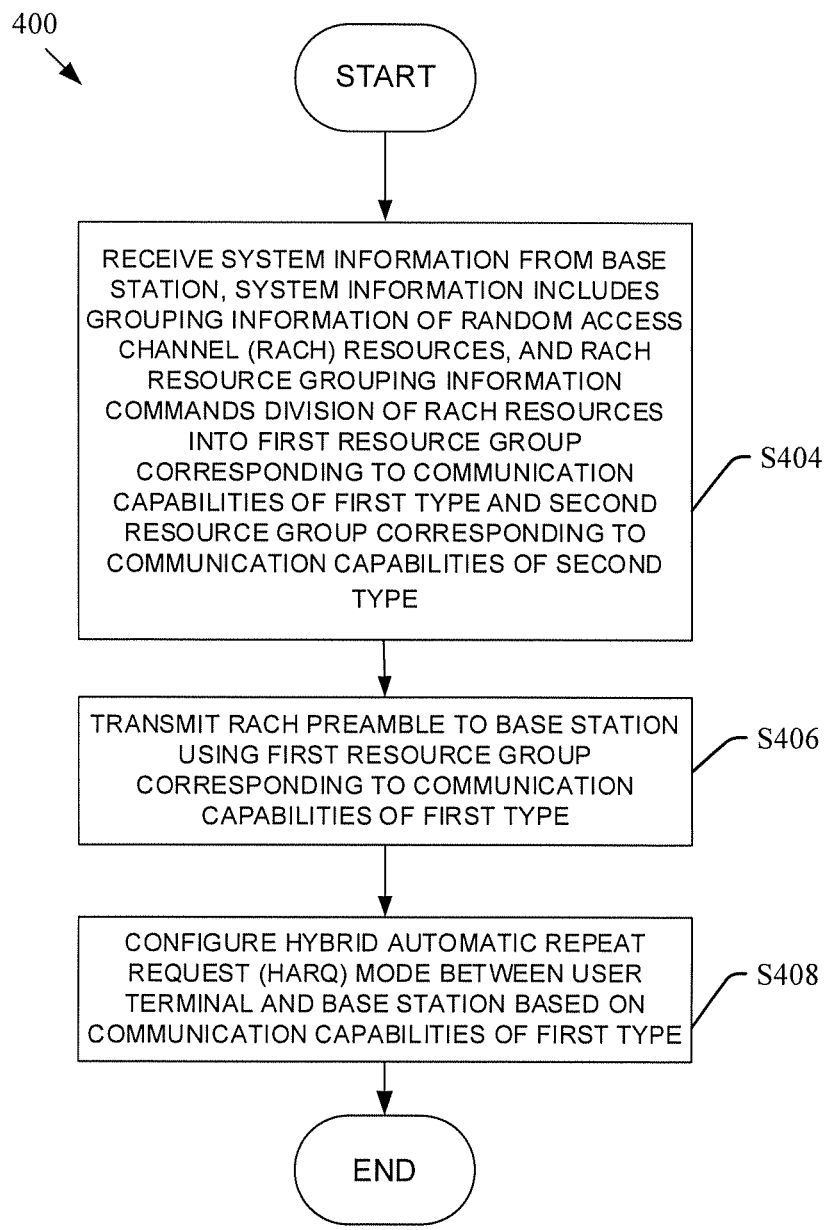
FIGS. 4A and 4B are flowcharts to show communication methods for user terminal supporting communication capabilities of the first type, according to an embodiment of the present disclosure.

As shown in FIG. 4A, in step S404, the system information from the base station is received, and this system information includes grouping information of RACH resources. The RACH resource grouping information commands division of random access channel (RACH) resources into a first resource group, which corresponds to communication capabilities of the first type, and a second resource group, which corresponds to communication capabilities of the second type. The first resource group includes at least one of first frequency resources, first time resources and a first preamble group, corresponding to communication capabilities of the first type, and the second resource group includes at least one of second frequency resources, second time resources and a second preamble group, corresponding to communication capabilities of the second type.

In step S406, a RACH preamble is transmitted to the base station using the first resource group corresponding to communication capabilities of the first type.

For example, if the user terminal supports communication capabilities of the first type, in step S406, a RACH preamble may be transmitted to the base station using a first frequency resource or a first time resource, or one RACH preamble may be selected from the first preamble group and transmitted to the base station. When the user terminal supports communication capabilities of the second type, in step S406, a RACH preamble may be transmitted to the base station using a second frequency resource or a second time resource, or one RACH preamble may be selected from the second preamble group and transmitted to the base station.

In step S408, the HARQ mode between the user terminal and the base station based on first-type communication capabilities is configured.

For example, in the example of configuring the feedback scheme for delivering HARQ acknowledgments in response to downlink data, when the user terminal supports communication capabilities of the second type, the feedback scheme then is configured so that HARQ feedback information is transmitted to the base station in response to every downlink data. When the user terminal supports communication capabilities of the first type, the user terminal may bundle feedback information in response to a plurality of pieces of downlink data together and transmit the bundled feedback information to the base station.

Note that, in an example of the scheme for configuring HARQ process numbers, when the user terminal supports communication capabilities of the first type, the user terminal may determine the HARQ process numbers by acquiring four bits of data from the downlink control information (DCI).

A specific example of the above method 400 will be described in detail below with reference to FIG. 6.

Figure 4B:
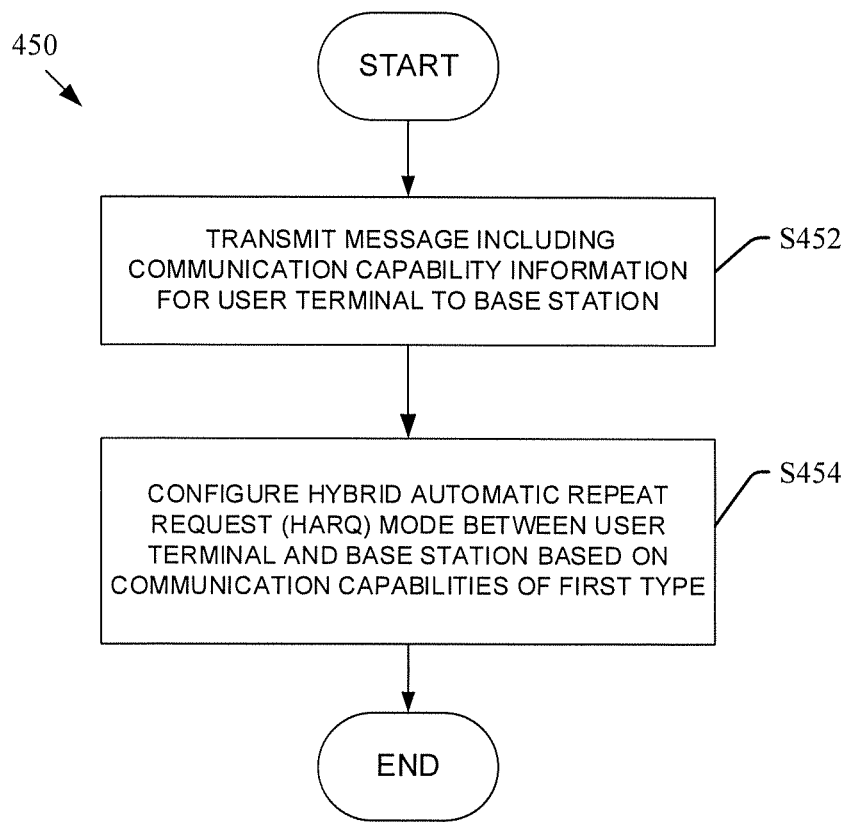

The method 450 shown in FIG. 4B corresponds to the second embodiment of the method of configuring the HARQ mode, which has been described above with reference to FIG. 2.

As shown in FIG. 4B, in step S452, a message including communication capability information for user terminal is transmitted to the base station. For example, an RRC connection complete message, including communication capability information of user terminal, is transmitted to the base station.

In step S454, the HARQ mode between the user terminal and the base station is configured based on second-type communication capabilities. For example, the HARQ mode between the user terminal and the base station may be configured in a similar scheme to the above-described step S408, and therefore explanation will be omitted here.

The method 450 may further include the steps of receiving an acknowledgment in response to the above message (for example, RRC connection complete message) from the base station, and configuring the HARQ mode between the user terminal and the base station based on communication capabilities of the second type, before an acknowledgment is received in response to the message. For example, HARQ process numbers may be determined by acquiring three bits of data from the downlink control information (DCI). Also, for example, supporting communication capabilities of the second type, the user terminal may send feedback in response to downlink data from the base station, on a one-to-one basis. That is, the user terminal may acknowledge every downlink data by transmitting an HARQ acknowledgment message (HARQ-ACK or HARQ-NACK) to the base station.

One specific example according to the above method 450 will be described below in detail with reference to FIG. 7.

Now, user terminal to support communication capabilities of the first type according to an embodiment of the present disclosure will be described below with reference to FIG. 5.

Figure 5:
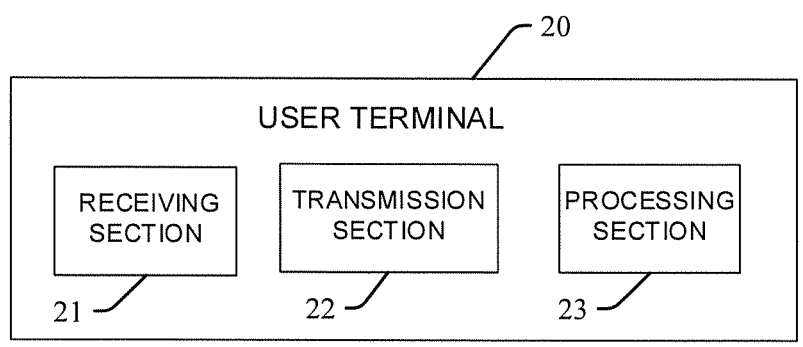
FIG. 5 is a block diagram to show user terminal supporting communication capabilities of the first type, according to an embodiment of the present disclosure.

As shown in FIG. 5, user terminal 20 includes a receiving section 21, a transmission section 22 and a processing section 23. Note that, although FIG. 5 only shows elements that are closely related to the embodiment of the present disclosure in the user terminal 20, these are only illustrative, and the user terminal 20 may include other elements as well, on an as-needed basis.

According to the above first embodiment, the receiving section 21 is configured to receive system information from the base station, the system information includes grouping information of RACH resources, and the RACH resource grouping information commands division of RACH resources into a first resource group, which corresponds to communication capabilities of the first type, and a second resource group, which corresponds to communication capabilities of a second type.

The transmission section 22 is configured to transmit a RACH preamble to the base station using a first resource group corresponding to communication capabilities of the first type.

For example, if the user terminal supports communication capabilities of the first type, the transmission section 22 may transmit a RACH preamble to the base station using a first frequency resource or a first time resource, or transmit one RACH preamble that is selected from the first preamble group, to the base station. When the user terminal supports communication capabilities of the second type, the transmission section 22 may transmit a RACH preamble to the base station using a second frequency resource or a second time resource, or transmit one RACH preamble that is selected from the second preamble group, to the base station.

The processing section 23 is configured so that the HARQ mode between the user terminal and the base station is configured based on communication capabilities of the first type.

For example, in the example of configuring the feedback scheme for delivering HARQ acknowledgments in response to downlink data, when the user terminal supports communication capabilities of the second type, the processing section 23 configures the feedback scheme then so that HARQ feedback information is transmitted to the base station in response to every downlink data. When the user terminal supports communication capabilities of the first type, the processing section 23 may bundle feedback information in response to a plurality of pieces of downlink data together, and transmit the bundled feedback information to the base station.

Note that, in an example of the scheme for configuring HARQ process numbers, when the user terminal supports communication capabilities of the first type, the processing section 23 determines HARQ process numbers by acquiring four bits of data from the downlink control information.

Combined with the second embodiment described above, the transmission section 22 may be further configured to transmit a message, which includes communication capability information for the user terminal, to the base station. For example, the transmission section 22 transmits an RRC connection complete message, including communication capability information for the user terminal, to the base station.

The processing section 23 is configured so that the HARQ mode between the user terminal and the base station is configured based on communication capabilities of the first type.

The receiving section 21 is further configured to receive an acknowledgment in response to the above message (for example, RRC connection complete message) from the base station. Before the acknowledgment in response to the above message is received in the receiving section 21, the processing section 23 configures the HARQ mode between the user terminal and the base station based on communication capabilities of the second type. For example, the processing section 23 determines HARQ process numbers by acquiring three bits of data from the downlink control information (DCI). Also, for example, given that the user terminal supports communication capabilities of the second type, the processing section 23 may send feedback in response to downlink data from the base station, on a one-to-one basis. That is, the processing section 23 may acknowledge every downlink data by transmitting an HARQ acknowledgment message (HARQ-ACK or HARQ-NACK) to the base station.

Figure 6:
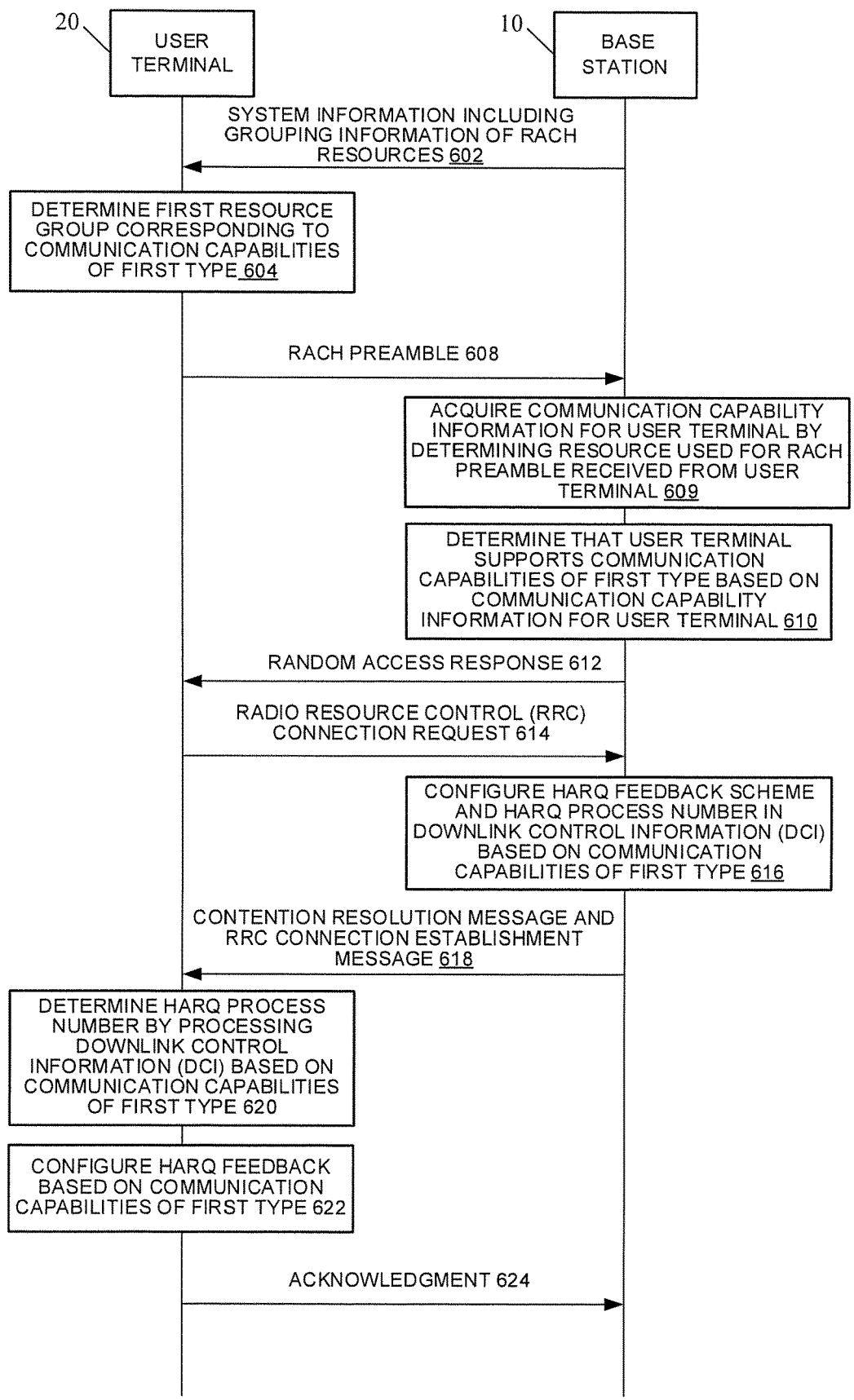
FIG. 6 is a first exemplary process diagram in which the HARQ mode between user terminal and a base station is configured based on interaction between the base station and the user terminal.

FIG. 6 shows a first exemplary process diagram, in which the HARQ mode between user terminal and a base station is configured based on interaction between the base station and the user terminal. First, the base station 10 broadcasts system information, which includes grouping information of RACH resources, to all the user terminal (step 602). The user terminal 20 determines the first resource group, which corresponds to communication capabilities of the first type, from the system information (step 604), and transmits a RACH preamble to the base station using the first resource group (step 608). The base station 10 acquires communication capability information for the user terminal by identifying the resource used for the RACH preamble received from the user terminal (step 609). Based on the communication capability information for the user terminal, the base station 10 determines that the user terminal supports communication capabilities of the first type (step 610).

The base station 10 transmits a random access response (RAR) to the user terminal 20 (step 612). The user terminal 20 transmits a radio resource control (RRC) connection request to the base station 10 (step 614). The base station 10 configures the HARQ mode between the base station and the user terminal, such as the HARQ feedback scheme, HARQ process numbers in downlink control information (DCI) and so on, based on first-type communication capabilities (step 616). The base station 10 transmits a contention resolution message and an RRC connection establishment message to the user terminal 20 (step 618).

The user terminal 20 configures the HARQ mode between the user terminal and the base station based on first-type communication capabilities, and, for example, determines HARQ process numbers by processing downlink control information (DCI) (step 620), and configures HARQ feedback (step 622). The user terminal 20 transmits an acknowledgment to the base station 10 (step 624).

Figure 7:
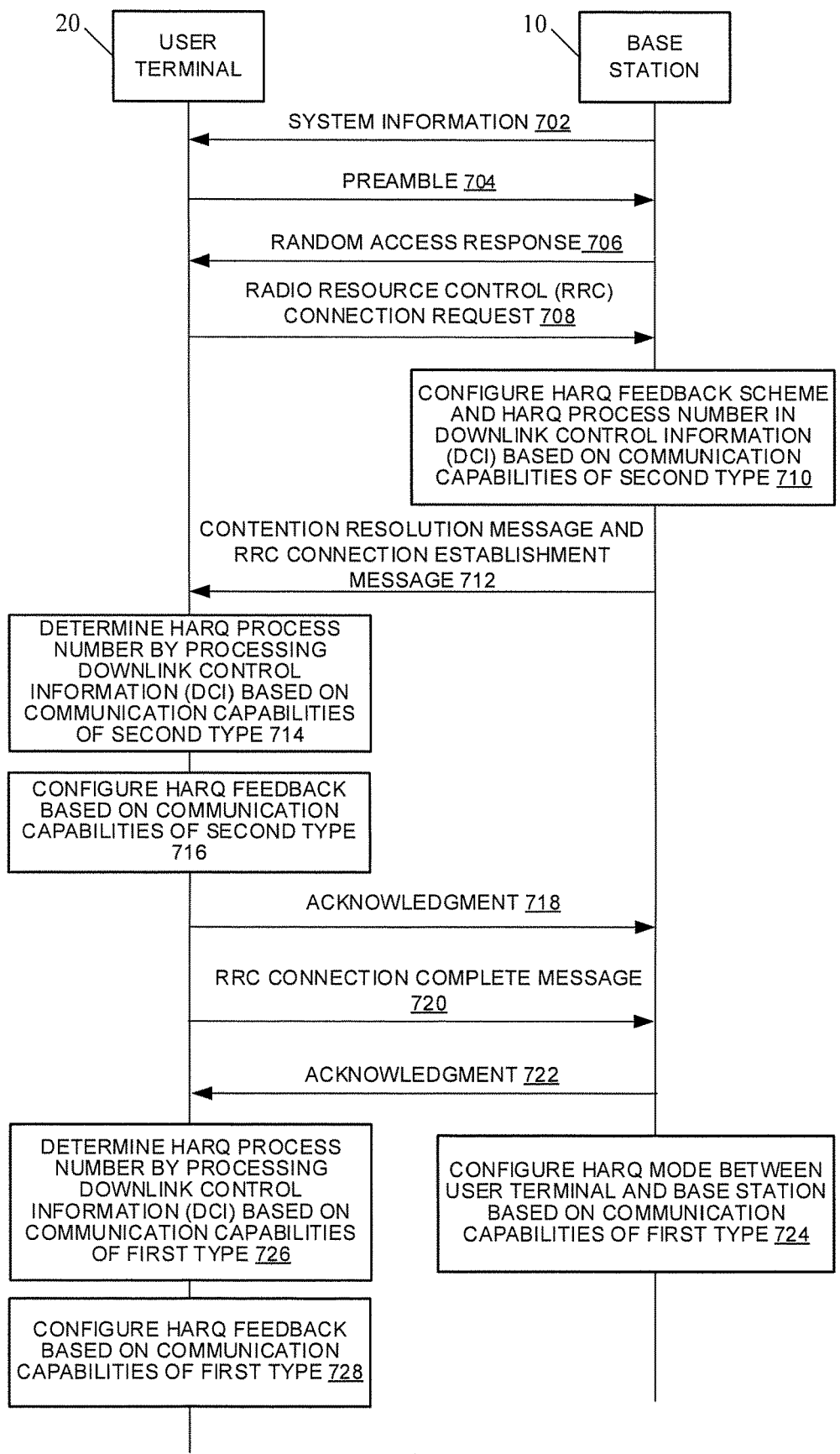
FIG. 7 is a second exemplary process diagram in which the HARQ mode between user terminal and a base station is configured based on interaction between the base station and the user terminal.

FIG. 7 shows a second exemplary process diagram, in which the HARQ mode between user terminal and a base station is configured based on interaction between the base station and the user terminal.

First, the base station 10 broadcasts system information to all the user terminal (step 702). The user terminal 20 transmits a preamble to the base station 10 using a RACH resource (step 704). The base station 10 transmits a random access response to the user terminal 20 (step 706). The user terminal 20 transmits a radio resource control (RRC) connection request to the base station 10 (step 708). The base station 10 configures the HARQ mode between the base station and the user terminal, such as the HARQ feedback scheme, HARQ process numbers in downlink control information (DCI) and so on, based on second-type communication capabilities (step 710). The base station 10 transmits a contention resolution message and an RRC connection establishment message to the user terminal 20 (step 712).

The user terminal 20 configures the HARQ mode between the user terminal and the base station based on second-type communication capabilities, and, for example, determines HARQ process numbers by processing downlink control information (DCI) (step 714), and configures HARQ feedback (step 716). The user terminal 20 transmits an acknowledgment to the base station 10 (step 718).

The user terminal 20 transmits an RRC connection complete message to the base station 10, and the RRC connection complete message contains information to the effect that the user terminal supports communication capabilities of the first type (step 720). The base station 10 transmits an acknowledgment to the RRC connection complete message to the user terminal 20 (step 722). In the base station 10, the HARQ mode between the user terminal and the base station is configured based on first-type communication capabilities (step 724).

Subsequently, the user terminal 20 configures the HARQ mode between the equipment and the base station based on first-type communication capabilities, and, for example, determines HARQ process numbers by processing downlink control information (DCI) (step 726), and configures HARQ feedback (step 728).

Figure 8:
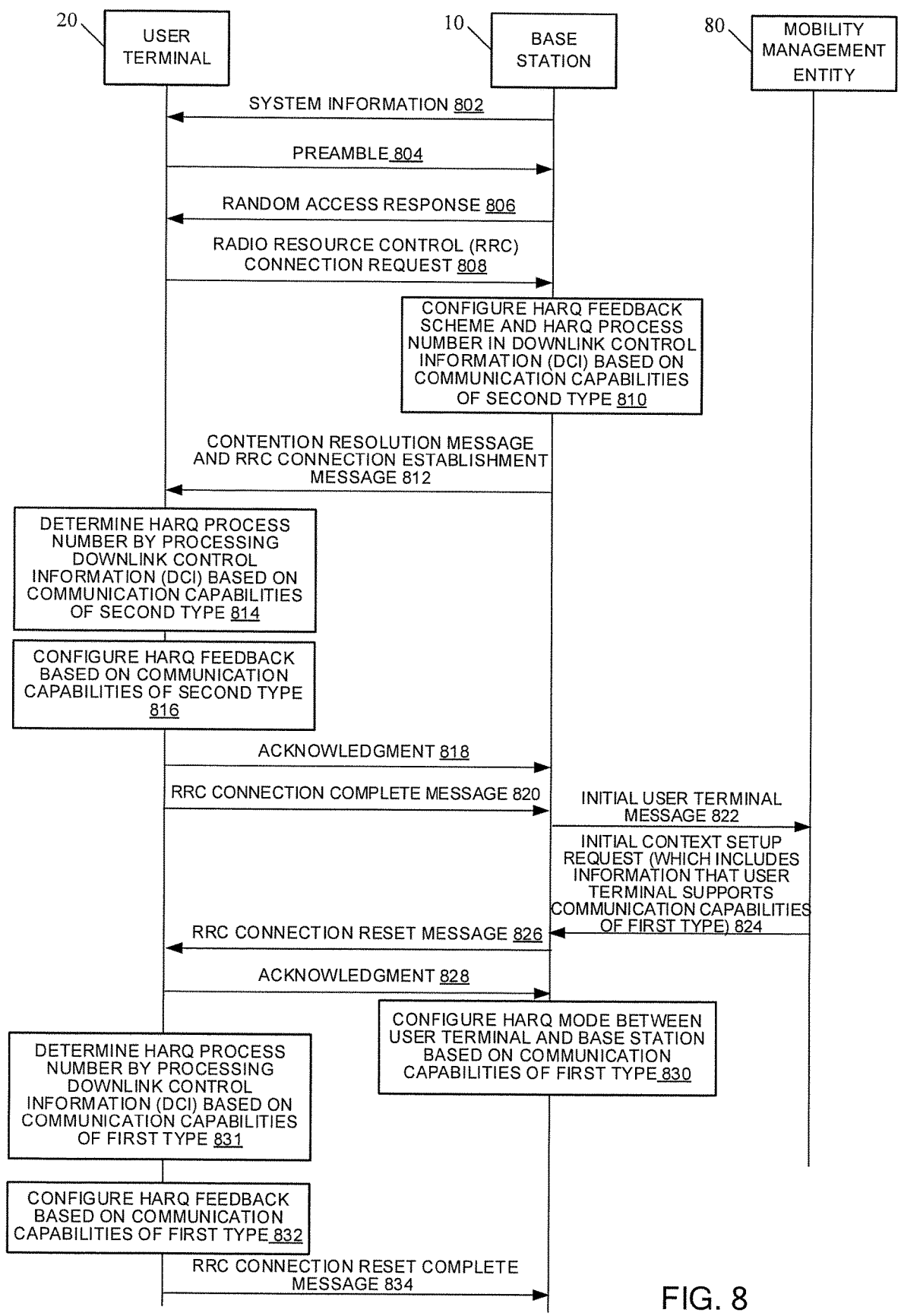
FIG. 8 is a third exemplary process diagram in which the HARQ mode between user terminal and a base station is configured by interaction among the base station, the user terminal and a mobility management entity.

FIG. 8 shows a third exemplary process diagram, in which the HARQ mode between user terminal and a base station is configured by interaction among the base station, the user terminal and a mobility management entity.

First, the base station 10 broadcasts system information to all the user terminal (step 802). The user terminal 20 transmits a preamble to the base station using a RACH resource (step 804). The base station 10 transmits a random access response to the user terminal (step 806). The user terminal 20 transmits a radio resource control connection (RRC) request to the base station 10 (step 808). Based on communication capabilities of the second type, the base station 10 configures the HARQ mode between the base station and the user terminal, such as the HARQ feedback scheme, HARQ process numbers in downlink control information (DCI) and so on (step 810). The base station 10 transmits a contention resolution message and an RRC connection establishment message to the user terminal 20 (step 812).

Based on communication capabilities of the second type, the user terminal 20 processes downlink control information (DCI) to determines HARQ process numbers (step 814), and configures HARQ feedback (step 816). The user terminal 20 transmits an acknowledgment to the base station 10 (step 818). The user terminal 20 transmits an RRC connection complete message to the base station 10 (step 820).

The base station 10 transmits an initial user terminal message to the mobility management entity 80 (step 822). The mobility management entity 80 transmits an initial context setup request, which includes information to the effect that the user terminal supports communication capabilities of the first type (step 824).

The base station 10 transmits an RRC connection reset message to the user terminal 20 (step 826). The user terminal 20 transmits an acknowledgment to the RRC connection reset message to the base station 10 (step 828). In the base station 10, the HARQ mode between the user terminal and the base station is configured based on first-type communication capabilities (step 830).

Subsequently, the user terminal 20 determines HARQ process numbers (step 831) by processing downlink control information (DCI) based on first-type communication capabilities, and configures HARQ feedback (step 832). The user terminal 10 transmits an RRC connection reset complete message to the base station 10 (step 834).

As described above, given a method for configuring an HARQ mode in a base station, a communication method for use by user terminal that supports communication capabilities of the first type, and a base station and user terminal according to embodiments of the present disclosure, it is possible to realize accurate and efficient communication between the base station and the user terminal, and improve the total capacity of communication and the wireless data access speed of the user terminal.

As used herein, the terms "include," "included" or other variations are intended to cover nonexclusive "inclusion," and processes, methods, articles or devices that include a series of elements not only include those elements, but also include other elements that are not explicitly shown, or include elements that are inherently provided in these processes, methods, articles, or devices. When an element is introduced with the phrase to the effect that "one element is provided," unless specified otherwise, in processes, methods, articles or devices including this element, there may be more than one of the same element.

Finally, it should be noted that the above series of processes not only includes processes executed in order of time as described herein, but also includes processes that are executed in parallel or that are executed separately, not in order of time.

According to the above described embodiment, a person skilled in the art knows that the present disclosure may be realized by adding hardware platforms to software wherever appropriate, and that, obviously, the whole of the present disclosure may be realized by hardware alone. This understood, all or part of the technical disclosure of the present disclosure contributing to background art may be realized in the form of a software product, and this computer software product may be stored in a storage medium such as a ROM/RAM, a magnetic disk, an optical disk and so on that contain multiple commands for executing the methods described in each or part of the embodiments of the present disclosure on a single computer device (which may be a personal computer, a server, a network device and so on).

Although the present disclosure has been described above in detail and the specification has described the principles and embodiments of the present disclosure with reference to specific examples, the description of the above-described embodiments is provided only for the purpose of understanding the methods and core concepts of the present disclosure. In addition, a person skilled in the art can also make changes to specific embodiments and the range of application based on concepts of the present disclosure, and specifically, it should be understood that the contents of this specification are not intended to limit the present disclosure.

The invention claimed is:

1. A terminal comprising a transmission section that transmits information about a capability for supporting HARQ bundling, to a radio base station,
   wherein the transmission section transmits bundled HARQ-ACKs to the radio base station based on the capability, and
   the capability for supporting HARQ bundling is capabilities for communicating according to an LTE release 14 standard.

2. The terminal according to claim 1, wherein, when HARQ bundling is not supported, an HARQ-ACK is transmitted to the radio base station in response to every downlink data.

3. A radio base station, comprising a receiving section that receives information about a capability for supporting HARQ bundling,
   wherein the receiving section receives bundled HARQ-ACKs based on the capability, and
   the capability for supporting HARQ bundling is capabilities for communicating according to an LTE release 14 standard.

4. A radio communication method, comprising the steps in which:
   a terminal transmits information about a capability for supporting HARQ bundling, to a radio base station; and
   the terminal transmits bundled HARQ-ACKs to the radio base station based on the capability,
   wherein the capability for supporting HARQ bundling is capabilities for communicating according to an LTE release 14 standard.

* * * * *